(12) United States Patent
Saidi et al.

(10) Patent No.: US 10,042,776 B2
(45) Date of Patent: Aug. 7, 2018

(54) PREFETCHING BASED UPON RETURN ADDRESSES

(71) Applicants: ARM Limited, Cambridge (GB); The Regents of the University of Michigan, Ann Arbor, MI (US)

(72) Inventors: Ali Saidi, Austin, TX (US); Thomas Friedrich Wenisch, Ann Arbor, MI (US); Aasheesh Kolli, Ann Arbor, MI (US)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 1226 days.

(21) Appl. No.: 13/681,801

(22) Filed: Nov. 20, 2012

(65) Prior Publication Data
US 2014/0143522 A1 May 22, 2014

(51) Int. Cl.
*G06F 9/38* (2018.01)
*G06F 12/1027* (2016.01)
*G06F 12/0862* (2016.01)

(52) U.S. Cl.
CPC ........ *G06F 12/1027* (2013.01); *G06F 9/3802* (2013.01); *G06F 9/3806* (2013.01); *G06F 12/0862* (2013.01); *G06F 2212/6028* (2013.01)

(58) Field of Classification Search
None
See application file for complete search history.

(56) References Cited

U.S. PATENT DOCUMENTS

| | | | | | |
|---|---|---|---|---|---|
| 3,559,183 | A * | 1/1971 | Sussenguth | ........... | G06F 9/3806 712/207 |
| 5,964,870 | A * | 10/1999 | Malizewski | .......... | G06F 9/3806 712/238 |
| 5,974,543 | A * | 10/1999 | Hilgendorf | ........... | G06F 9/3806 712/240 |
| 6,014,734 | A * | 1/2000 | Tran | .................... | G06F 9/30152 712/228 |
| 6,898,699 | B2 * | 5/2005 | Jourdan | ................ | G06F 9/3802 712/238 |
| 7,203,826 | B2 * | 4/2007 | Smith | ................... | G06F 9/3806 712/239 |
| 7,890,740 | B2 * | 2/2011 | Kranich | ............. | G06F 9/30054 712/228 |

(Continued)

OTHER PUBLICATIONS

IBM Technical Disclosure Bulletin NN9312181 "Context Oriented Branch Prediction," Dec. 1993.*

(Continued)

*Primary Examiner* — Steven Snyder
(74) *Attorney, Agent, or Firm* — Nixon & Vanderhye P.C.

(57) ABSTRACT

An apparatus for processing data includes signature generation circuitry 30, 32 for generating a signature value indicative of the current state of the apparatus in dependence upon a sequence of immediately preceding return addresses generating during execution of a stream of program instructions to reach that state of the apparatus. Prefetch circuitry 10 performs one or more prefetch operations in dependence upon the signature value that is generated. The signature value may be generated by a hashing operation (such as an XOR) performed upon return addresses stored within a return address stack 28.

21 Claims, 5 Drawing Sheets

(56) References Cited

U.S. PATENT DOCUMENTS

| | | | | |
|---|---|---|---|---|
| 7,975,132 | B2* | 7/2011 | Bean | G06F 9/30054 712/233 |
| 9,361,112 | B2* | 6/2016 | Demongeot | G06F 9/3844 |
| 2002/0188833 | A1* | 12/2002 | Henry | G06F 9/3806 712/236 |
| 2005/0154859 | A1* | 7/2005 | Gilkerson | G06F 9/30054 712/207 |
| 2006/0190711 | A1* | 8/2006 | Smith | G06F 9/3806 712/242 |
| 2008/0005543 | A1* | 1/2008 | Rychlik | G06F 9/3806 712/239 |
| 2008/0244137 | A1* | 10/2008 | Kranich | G06F 9/30054 710/261 |
| 2010/0228952 | A1* | 9/2010 | Bean | G06F 9/30054 712/205 |
| 2011/0238917 | A1* | 9/2011 | Lin | G06F 9/3804 711/125 |
| 2012/0233442 | A1* | 9/2012 | Shah | G06F 9/3806 712/207 |
| 2012/0297167 | A1* | 11/2012 | Shah | G06F 9/30101 712/202 |
| 2013/0185545 | A1* | 7/2013 | Lin | G06F 9/30043 712/225 |
| 2014/0317390 | A1* | 10/2014 | Demongeot | G06F 9/3806 712/239 |
| 2014/0344558 | A1* | 11/2014 | Holman | G06F 9/3806 712/239 |
| 2015/0205613 | A1* | 7/2015 | Bhatia | G06F 9/30054 712/207 |
| 2017/0286116 | A1* | 10/2017 | Johar | G06F 9/30047 |

OTHER PUBLICATIONS

'Call vs Jmp: The Stack Connection' CS 301 Lecture, Dr. Lawlor, Fall 2012.*

'Improving Prediction for Procedure Returns with Return-Address-Stack Repair Mechanisms' by Kevin Skadron et al., copyright 1998, IEEE.*

'Speculative Return Address Stack Management Revisited' by Hans Vandierendonck et al., ACM Transactions on Architecture and Code Optimization, vol. 5, No. 3, Article 15, Publication date: Nov. 2008.*

IBM Technical Disclosure Bulletin NA81123255.*

'RDIP: Return-address-stack Directed Instruction Prefetching' by Aasheesh Kolli et al., Dec. 2013.*

M. Annavaram et al, "Call Graph Prefetching for Database Applications" 10 pages.

I-C. Chen et al, "Instruction Prefetching Using Branch Prediction Information" *Int. Conf. Computer Design 97*, Oct. 1997, 9 pages.

A.V. Veidenbaum, "Instruction Cache Prefetching Using Multilevel Branch Prediction" pp. 1-19.

G. Reinman et al, "Fetch Directed Instruction Prefetching" *Proceedings of the 32nd Annual International Symposium on Microarchitecture (MICRO-32)*, Nov. 1999, pp. 1-12.

A. Ramirez et al, "Fetching instruction streams" IEEE, 2002, pp. 371-382.

M. Ferdman et al, "Temporal Instruction Fetch Streaming" *Proceedings of the 41st Annual IEEE/ACM Int'l Symposium on Microarchitecture*, 2008, pp. 1-10.

M. Ferdman et al, "Proactive Instruction Fetch" *Proceedings of the 44th Annual IEEE/ACM International Symposium on Microarchitecture*, 2011, pp. 1-11.

Y. Zhang et al, "Execution History Guided Instruction Prefetching" pp. 1-20.

C-K. Luk et al, "Architectural and Compiler Support for Effective Instruction Prefetching: A Cooperative Approach" *ACM Transactions on Computer Systems*, vol. 19, No. 1, Feb. 2001, pp. 71-109.

S. Hines et al, "Guaranteeing Instruction Fetch Behavior with a Lookahead Instruction Fetch Engine (LIFE)" LCTES'09, Jun. 2009, pp. 119-128.

* cited by examiner

PREFETCHING BASED UPON RETURN ADDRESSES

BACKGROUND

This Invention relates to the field of data processing systems. More particularly, this invention relates to data processing systems incorporating mechanisms for prefetching from memory.

It is known to provide data processing systems with prefetching mechanisms. Such prefetching mechanisms may include instruction prefetching mechanisms that seek to fetch from a higher level in the memory system program instructions required to execute a desired stream of program instructions in advance of these program instructions being required for execution. A problem is that there may be discontinuities in the stream of program instructions executed due to, for example, branch instructions or return and call instructions. If the prefetching mechanisms fail to supply the program instructions required, then this can stall the processor resulting in a significant loss of performance.

It is known to include prefetching mechanisms which seek to predict branch instructions and the outcomes of branch behaviour. The performance benefit to be achieved with accurate branch prediction, particularly in the case of processors with deep instruction pipelines, is significant and accordingly justifies significant resources to be expended to improve the prediction accuracy. Another type of prediction mechanism is based upon the identification of call and return instructions in the program stream. When a call or return instruction is encountered again, then the target address may be predicted based upon the previous behaviour. Thus, a list of addresses at which previous call or return instructions were encountered may be stored together with the target addresses for those call or return instructions.

Measures which can increase the accuracy of the prefetching predictions such that the processor does not stall while waiting for instructions or data to be fetched are strongly advantageous. Furthermore, increases in prediction accuracy which may be achieved with little additional resources are also advantageous.

SUMMARY

Viewed from one aspect the present invention provides apparatus for processing data in response to execution of a stream of program instructions including call instructions with respective associated return addresses, said apparatus comprising:
  signature generation circuitry configured to generate a signature value indicative of a current state of said apparatus in dependence upon a plurality of return addresses generated during execution of said stream; and
  prefetch circuitry configured to perform one or more prefetch operations in dependence upon said signature value.

The present technique recognises that the history of return addresses generated up to reaching the present state of a processor may be used to generate a signature value which represents the state of the processor. The behaviour of a call or return instruction is correlated with the processing path taken to reach that call or return instruction. This processing path may be represented by a plurality of preceding return addresses that were generated during execution of the stream of program instructions up to the point at which the signature is being generated. A signature generated in this way based upon a plurality of return addresses may then be used to direct one or more prefetch operations in dependence upon the signature value concerned. This technique can, in some embodiments, produce an increased prediction accuracy with a relatively low increase in circuit overhead.

An updated signature value may be generated either when a new return address is generated upon occurrence of a call instruction or when a previously generated return address is consumed upon occurrence of a return instruction. Both of these events represent markers in the stream of instructions executed that can be used to generate a signature with a strong correlation to the state of the system and accordingly the possibility of providing more accurate prediction for prefetch operations to be performed. It will be appreciated that in other embodiments, signatures might only be generated upon occurrence of call instructions or only occurrence of return instructions if that were desired.

The prefetching circuitry may be perform the prefetch operations in a manner decoupled from the generation of new signatures, e.g. at a set period depending upon whatever is the current value of the signature. However, in some embodiments the generation of an updated signature value may serve to trigger the prefetch circuitry to perform one or more prefetch operations in dependence upon that updated signature value.

The updated signature value may vary depending upon whether or not it was produced as a result of generation of a new return address or as a result of the consumption of a previously generated return address. These different options represent different paths to reaching a current history of stacked return addresses and accordingly should be identified with different signatures so that different predicted prefetches may be performed in dependence upon those different signatures.

In some embodiments the signature may include a bit which indicates whether or not it was generated in response to generation of a new return address or consumption of a previously generated return address (i.e. a call instruction or a return instruction).

When the updated signature is generated in response to generation of a new return address, then the updated signature value may be dependent upon a plurality of return addresses that includes the new return address. The new return address is part of the state associated with the corresponding call instruction and accordingly can be used to generate the signature characteristic of the current state.

When the updated signature value is generated in response to a consumption of a previously generated return address, then the updated signature value may be dependent upon a plurality of return addresses including the previously generated return address value that is consumed. The consumed previously generated return address is part of the state associated with that return instruction which has been encountered and accordingly may be used to differentiate between different states of the apparatus concerned and so provide more accurate prediction.

The signature generation circuitry may form the signature from the plurality of return addresses in a variety of different ways. As an example, it would be possible to merely concatenate all of the return addresses to form a large bit field which would serve as a signature. However, such an embodiment would be an inefficient use of storage space. In some embodiments the signal generation circuitry is configured to perform a hashing function, such as an XOR operation or a truncated addition, upon the plurality of return addresses so as to generate the signature value. Forming the signature value in this way provides a more compact signature and accordingly reduces the amount of resource needed for storage and manipulation of the signatures.

The prefetching operations performed can take a variety of different forms. As previously discussed, the present technique may be used to direct the prefetching of program instructions or blocks of program instructions. It is also possible to prefetch data values or blocks of data values as the need to fetch such data values from higher levels within the memory hierarchy can also stall the processor in an undesirable way. In addition, the prefetch operations may prefetch translation data for translating between virtual addresses and physical addresses within the memory hierarchy, such as translation lookaside buffer data. Misses in the translation lookaside buffer can cause long stalls in the operation of the system as it may be necessary to perform a page table walk taking many processor cycles in order to recover the desired translation data.

In some embodiments, a signature cache memory may be provided to store a plurality of signature values each with respective prefetch data indicative of one more prefetch operations to be performed. Storing a plurality of signature values in this way increases the likelihood that prefetch data will be stored for a particular signature value encountered.

The system may comprise at least one further cache memory and the prefetch data for a given signature can identify one or more addresses associated with respective cache misses within the further cache memories that have previously occurred when the apparatus had a state corresponding to that given signature. Identifying cache misses which occur for a given signature can be used to generate prefetch data for triggering prefetch operations which will correspond to those cache misses should the given state be encountered again.

The prefetch data may be stored in a variety of different forms. In some embodiments a separate address may be stored for each prefetch operation to be performed. However, more compact storage of the prefetch data which recognises that misses tend to be clustered together within the memory space is one in which the prefetch data identifies at least one base memory address and for each base memory address a bit field identifies one or more further memory addresses relative to that base memory address where a miss has also occurred.

Miss detecting circuitry may be coupled to the one or more further caches and configured to detect cache misses within the one or more further cache memories. These cache misses may then be used to form prefetch data for a current signature value by accumulating data identifying cache misses for the current signature value and generating the prefetch data when the current signature value changes to a new current signature value.

The signature generation circuitry may, in some embodiments, simply generate a signature value by hashing in new return addresses into an existing signature value on an on-going basis without a return address stack itself being present within the prefetch circuitry. However, the present techniques are useful in conjunction with a system that also includes a return address stack memory storing data identifying a sequence of return addresses generated during immediately preceding execution of the stream of program instructions. The provision of such a return address stack memory is useful for directing a prefetch to be conducted for the target of an encountered return instruction. When mechanisms are in place to support such a return address stack memory, then the present techniques for generating signatures and providing for further prefetch operations may be added and reuse at least some of the resources and mechanism provided for the return address stack memory.

A convenient form of return address stack memory is a ring buffer memory. As a return address stack memory is not seeking to provide a definitive return address stack as may be supported by software, but rather provides a hardware level hint as to useful prefetching that may be performed in respect of a return instruction target and thus is not essential for the a program to execute along the correct path. A ring buffer provides a good approximation to real software support return address stack storage providing the stack does not become too deep.

When the signature value changes indicating that a new return instruction has been encountered, then this may be used to trigger prefetch operations associated with the newly updated signature value (in other embodiments the signature could change when a return or a call is encountered). However, the data to be prefetched may be required soon after the return instruction concerned has generated the updated signature value and so there may be insufficient time to perform all of the desired prefetch operations. Accordingly, in some embodiments the prefetch circuitry may be configured to use the updated signature value to predict an $N^{th}$ following updated signature value that will be generated based upon a sequence of previously generated updated signature values, where N is an integer of one or more. The one or more prefetch operations performed may then be prefetch operations associated with the $N^{th}$ following updated signature value. In this way, when the signature value is updated, it triggers prefetch operations that are predicted to be required in association with an $N^{th}$ following update of the signature value. This gives more time for those prefetch operations to be performed before the instructions or data they will prefetch are required (at the risk of wasting energy by predicting too far ahead along an execution path that for some reason is not followed, e.g. a task switch or an interrupt).

Table storage circuitry may be provided to store data mapping updated signature values to respective $N^{th}$ following updated signature values. The table storage circuitry may be, for example, a cache or content addressable memory.

Viewed from another aspect the present invention provides apparatus for processing data in response to execution of a stream of program instructions including call instructions with respective associated return addresses, said apparatus comprising:

signature generation means for generating a signature value indicative of a current state of said apparatus in dependence upon a plurality of return addresses generated during execution of said stream; and prefetch means for performing one or more prefetch operations in dependence upon said signature value.

Viewed from a further aspect the present invention provides a method of processing data, using apparatus for processing data, in response to execution of a stream of program instructions including call instructions with respective associated return addresses, said method comprising the steps of:

generating a signature value indicative of a current state of said apparatus in dependence upon a plurality of return addresses generated during execution of said stream; and performing one or more prefetch operations in dependence upon said signature value.

The above, and other objects, features and advantages of this invention will be apparent from the following detailed description of illustrative embodiments which is to be read in connection with the accompanying drawings.

DESCRIPTION OF EXAMPLE EMBODIMENTS

Figure 1:
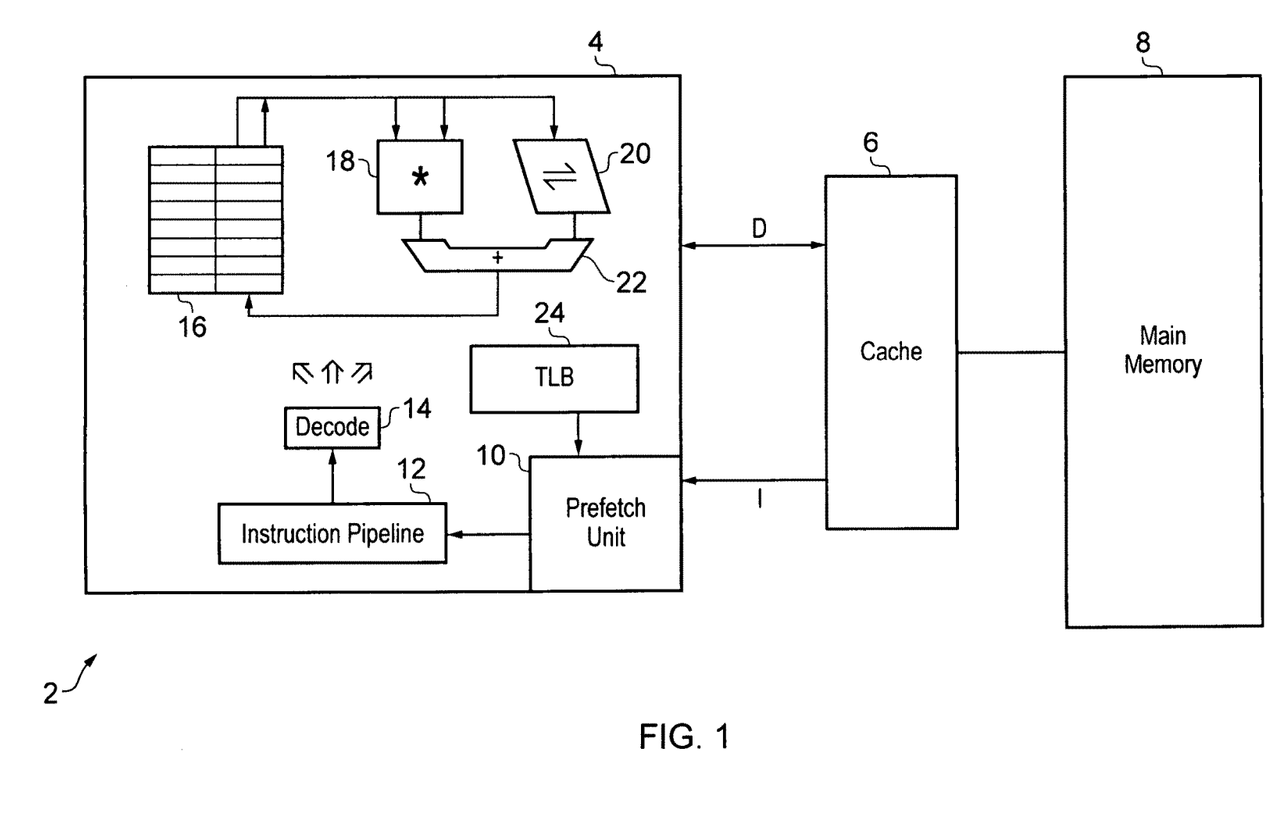
FIG. 1 schematically illustrates a data processing system incorporating a memory (with multiple levels within a memory hierarchy) and a processor including a prefetch unit.

FIG. 1 schematically illustrates a data processing apparatus 2 including a processor 4, a cache memory 6 and a main memory 8. The cache memory 6 and the main memory 8 form a memory system having a hierarchy of memory levels, namely the cache memory 6 and the main memory 8. The cache memory 6 corresponding to the previously mentioned one or more further cache memories into which instructions or data are prefetched by a prefetch unit 10 within the processor 4.

The processor 4 receives program instructions I and data D from the cache memory 6 and performs processing operations in accordance with a stream of program instructions executed using an instruction pipeline 12. When the instructions reach a decode stage within the instruction pipeline 12, then decode circuitry 14 decodes those instructions and generates control signals used to control data processing performed using circuits such as a register bank 16, a multiplier 18, a shifter 20 and an adder 22. It will be appreciated that in practice the processor 4 may contain many other elements and that these have been omitted from FIG. 1 for the sake of simplicity.

The processor 4 includes a translation lookaside buffer 24 which stores translation data for translating between virtual addresses and physical addresses. Such a translation lookaside buffer 24 is important for high performance operation when using virtual addresses. A significant performance penalty may arise upon a miss within the translation lookaside buffer 24 that requires a page table walk to be performed before a translation may be made between a virtual address and a physical address to be accessed. For this reason, it is advantageous if such translation data is prefetched into the translation lookaside buffer 24 with a high degree of accuracy. The present techniques may be used to prefetch such page table translation data into the translation lookaside buffer 24 which may also be considered to form a further cache memory in addition to the cache memory 6.

Figure 2:
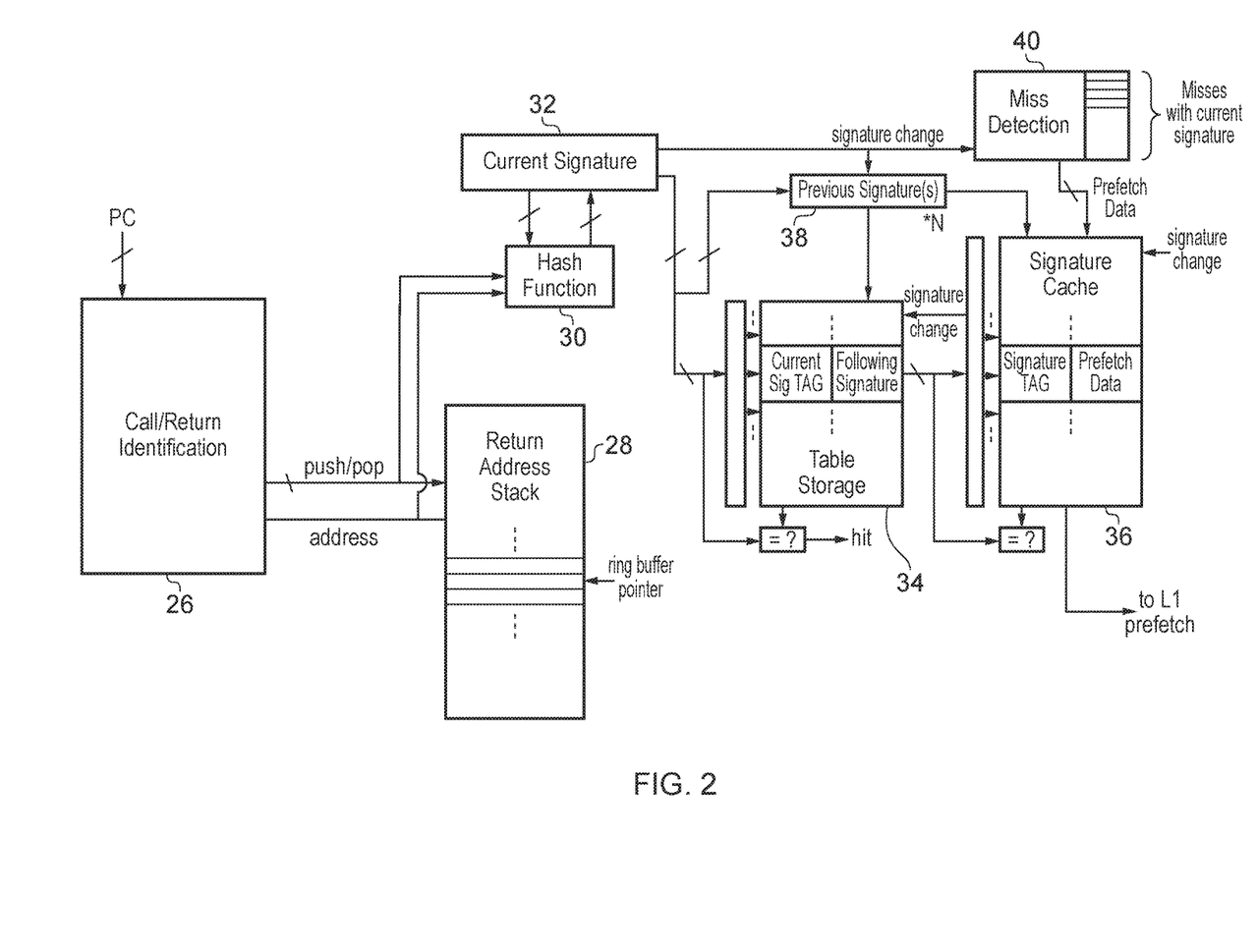
FIG. 2 schematically illustrates signature generation circuitry and prefetch circuitry in accordance with one example of the present technique.

FIG. 2 schematically illustrates processing circuitry which may be located within the prefetch unit 10 and which serves to generate a signature value indicative of a current state of the apparatus in dependence upon the plurality of return addresses generated during execution of the program stream leading to that current state of the apparatus. The circuitry further performs prefetch operations in dependence upon the signature value.

Call and return instruction identification circuitry 26 serves to identify call or return instructions within the program stream. This may be achieved, by, for example, identifying call and return instructions when they are decoded by the instruction decoder 14 and storing the program addresses associated with those call or return instructions within the call and return identification circuitry 26. When program counter values matching those of previous call or return instructions are again encountered, then this stored data may be used to identify the instructions concerned as call or return instructions. If the instruction is a call instruction, then the program counter address plus any increment corresponding to the instruction length (typically four bytes) will be stored as a return address with a push operation to the return address stack. A return instruction will pop a return address from the return address stack for controlling prefetching of instructions from that return address. The return address stack 28 may be provided in the form of a ring buffer with a ring buffer pointer indicating the current top of stack position.

The return address and an indication of whether or not a call instruction or a return instruction has been encountered is supplied to hash function circuitry 30 which forms part of the signature generation circuitry in conjunction with a current signature store 32. The hash function circuitry 30 performs a hash function, as will be described below in relation to FIG. 3, in order to form a new current signature value corresponding to the current state of the apparatus as indicated by the history of return addresses and whether or not call instructions or return instructions are encountered.

The current signature value is supplied to table storage circuitry 34 where it is used to look up a mapping between that current signature value and a $N^{th}$ following signature value (N is an integer of one or greater). The table storage circuitry 34 may be arranged as a cache memory in which a portion of the current signature is used as an index into one of the rows and then the remainder of the current signature is used to form a tag value which is compared with a tag value stored into the indexed row when it was populated. If there is a hit within the table storage circuitry, then the stored following signature value for that row is output to a signature cache 36. The signature cache 36 is similarly arranged to index in to a given row, to compare a part of the following signature with a signature tag within that row and to generate a hit if there is a match. If a hit is generated, then prefetch data from that row within the signature cache is output and used to trigger prefetch operations by the prefetch unit 10.

Previous signature storage circuitry 38 provides an N deep buffer of previously generated signature values. These previously generated signature values are used to update (if necessary) the contents of the table storage circuitry 34 when there is a change of the current signature value. This both populates the table storage circuitry 34 with newly encountered current signatures as well as updating the mapping of previously encountered current signatures to following signatures as these may change. The most recently generated previous signature as stored within the previous signature buffer circuitry 38 is supplied upon a signature change to the signature cache 36 where it is used to update the prefetch data associated with that previous signature value.

Miss detection circuitry 40 serves to accumulate addresses of misses within the further caches 6, 24 of the data processing system 2 which occur for a current signature value. When the signature value changes and the current signature value becomes the most recent previous signature value, then those accumulated miss addresses may be combined to form prefetch data to be stored within the signature cache 36 in combination with that most recent previous signature value.

Figure 3:
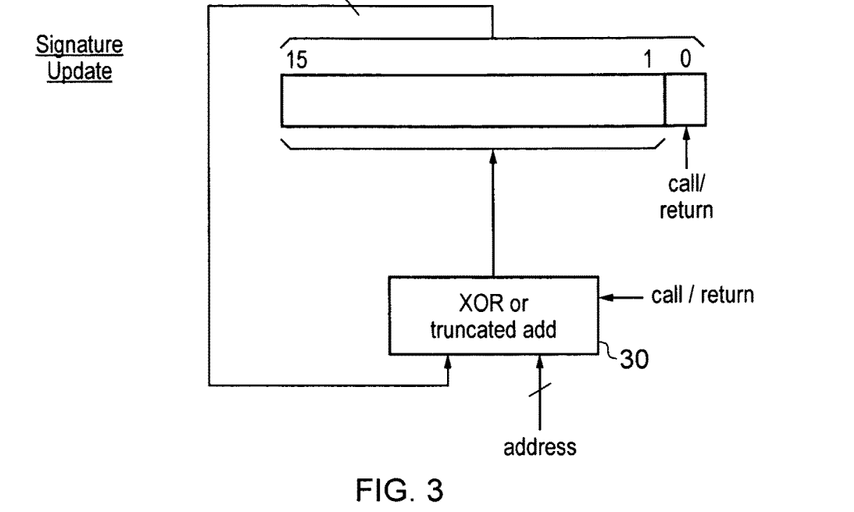
FIG. 3 schematically illustrates signature update.

FIG. 3 schematically illustrates the signature update process. The signature values may be 16-bit values with the least significant bit representing whether or not the signature value was generated in response to detection of a call instruction or detection of a return instruction. The hash function circuitry 30 performs a hashing operation, such as an XOR or a truncated add, upon the 16-bits drawn from the previous signature value together with the new return address to generate 15 bits to be supplied to bit positions [15:1] of the new signature value.

Figure 4:
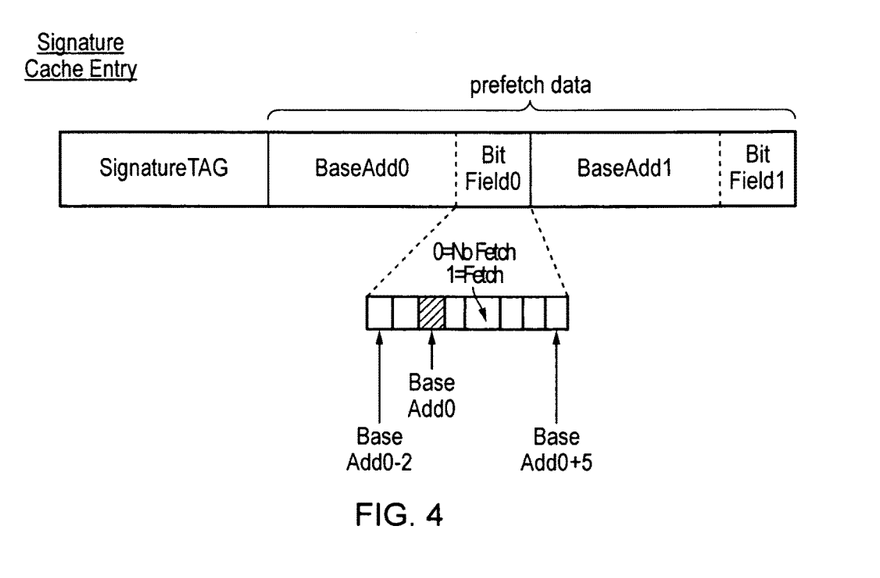
FIG. 4 schematically illustrates an entry within a signature cache.

FIG. 4 schematically illustrates the contents of one row within the signature cache 33. A signature tag value is used in conjunction with indexing into a particular cache line to identify whether the signature value from the table storage circuitry 34 being supplied to the signature cache 36 hits within the row stored within the signature cache 36. The prefetch data comprises two base addresses each with an associated bit field. The base address specifies one memory address and the bit fields specify further memory addresses with predetermined offsets from the associated base address. If the granularity of the prefetch operations is individual 32-bit instructions, then the base address will specify one 32-bit portion of memory where a cache miss occurred and a prefetch operation should be performed. In this case, each of the bit field bits contains a bit value indicating whether or not a fetch should be performed for corresponding 32-bit values.

The granularity of the prefetches may be blocks of instructions or data values, such as cache lines within the cache 6, and in this case the individual bits within the bit field correspond to different cache lines, each offset from the base address cache line but forming contiguous blocks of cache lines within the memory address space. In practice it is found that misses associated with a new signature value tend to occur clustered together in the memory address space and accordingly the prefetch data representation illustrated in FIG. 4 provides useful span of prefetches to be specified whilst representing this in a compact form.

Figure 5:
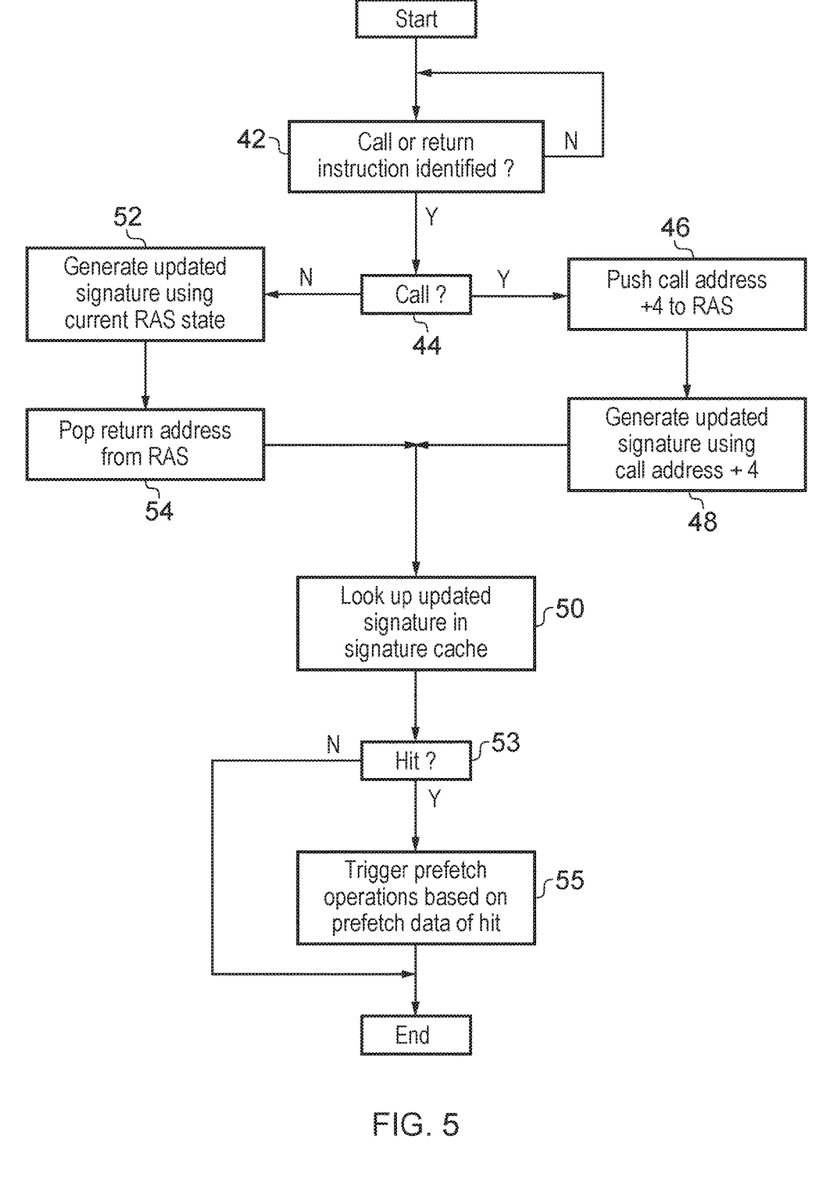
FIG. 5 is a flow diagram schematically illustrating the updating of a signature and the triggering of prefetch operations.

FIG. 5 is a flow diagram schematically illustrating updated signature generation and the triggering of prefetch operations. At step 42 processing waits until a call instruction or a return instruction is identified by the call or return instruction identification circuitry 26. When such an instruction is identified, then step 44 determines whether or not the instruction was a call instruction. If the instruction was a call instruction, then step 46 pushes the call instruction address plus 4 (assuming 4 byte instructions) as the return address for that call instruction onto the return address stacked 28. It will be appreciated that the architectural return address stack will likely be maintained by software and will typically have a size potentially much larger than the return address stack 28 which is provided for the purposes of performance enhancement by providing prefetching hints to the prefetch unit 10.

At step 48 an updated signature is generated using the previous signature value and the new return address which was pushed to the return address stack 26 at step 46. The newly generated signature value is dependent upon a plurality of signature values since the previous signature value was generated from other signature values and thus there is a dependence between the newly generated signature value and a plurality of previous return addresses in a contiguous sequence of immediately preceding return addresses. At step 50 a lookup is performed using the updated signature value in the signature cache 36.

If the result of step 44 was that a return instruction was identified at step 42, then step 52 serves to generate the updated signature value using the current return address stack state (as represented by the current signature value) together with a bit indicating that a return instruction has triggered generation of that updated signature value. At step 54 the return address is popped from the return address stack 28. Pushing and popping to the return address stack 28 is achieved by moving the position of the ring buffer pointer.

If the determination of the lookup at step 50 was that a hit occurs within the signature cache 36 as indicated at step 53, then processing proceeds to step 55 where one or more prefetch operations are performed based upon the prefetched data read from the line within the signature cache 36 which resulted in the hit. If a hit was not detected at step 53, then step 55 is bypassed.

Figure 6:
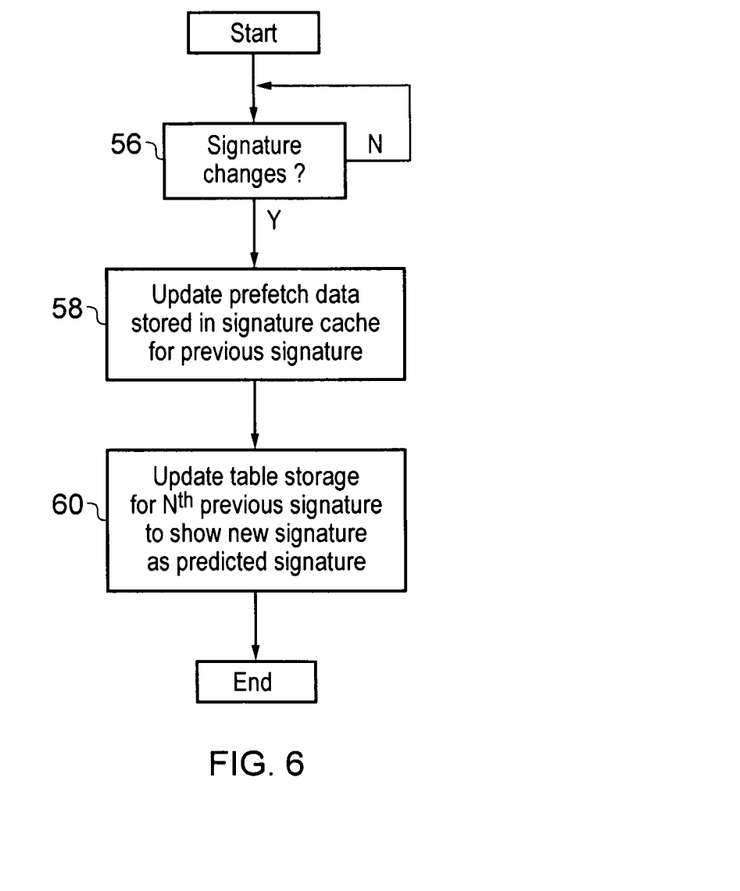
FIG. 6 is a flow diagram schematically illustrating the updating of prefetch data and the updating of data mapping between a current signature and an $N^{th}$ following signature value.

FIG. 6 is a flow diagram schematically illustrating the updating of the table storage circuitry 34 and the signature cache 36. Processing waits at step 56 until a signature change occurs. Step 58 updates the prefetch data stored within the signature cache 36 for the previous signature which has just been updated. The new prefetch data can be taken from the miss detection circuitry 40 which has accumulated misses for that previous signature value.

Step 60 serves to update the table storage circuitry 34 which stores the mapping between the current signature value and the $N^{th}$ following signature value which is used to predict a signature value that will arise after N changes the signature value and accordingly initiate the prefetch operations associated with that predicted signature value earlier than would otherwise be possible.

It will be appreciated that the table storage circuitry 34 may not be provided in some embodiments and instead the current signature value may be directly applied to the signature cache 36 (it is also possible that any of the last N signatures could be directly applied to the signature cache 36 as the new signature might not yet have been generated even though the RAS operation has occurred). This will give less time for the prefetch operations to be performed before the data which is required following the call or return instruction is required, but this may be sufficient in some embodiments and involves less speculative fetching.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data in response to execution of a stream of program instructions including call instructions with respective associated return addresses, said apparatus comprising:

signature generation circuitry configured to generate a signature value indicative of a current state of said apparatus in dependence upon address values of a plurality of return addresses generated during execution of said stream; and prefetch circuitry configured to perform one or more prefetch operations in dependence upon said signature value.

2. Apparatus as claimed in claim 1, wherein when execution of said stream either generates a new return address or performs a return operation that consumes a previously generated return address, said signature generation circuitry generates an updated signature value.

3. Apparatus as claimed in claim 2, wherein said prefetch circuitry performs one or more prefetch operations in dependence upon said updated signature value.

4. Apparatus as claimed in claim 2, wherein said updated signature value is dependent upon whether said updated signature value was generated in response to generation of said new return address or consumption of said previously generated return address.

5. Apparatus as claimed in claim 4, wherein when said updated signature value is generated in response to generation of said new return address, then said updated signature value is dependent upon said plurality of return addresses including said new return address.

6. Apparatus as claimed in claim 4, wherein when said updated signature value is generated in response to consumption of said previously generated return address, then said updated signature value is dependent upon said plurality of return addresses including said previously generated return address.

7. Apparatus as claimed in claim 4, wherein said new signature includes a direction bit indicating whether said updated signature value was generated in response to generation of said new return address or consumption of said previously generated return address.

8. Apparatus as claimed in claim 1, wherein said signature generation circuitry is configured to perform a hashing function upon said plurality of return addresses to generate said signature value.

9. Apparatus as claimed in claim 8, wherein said hashing function includes one or more of:
   an exclusive OR (XOR) operation performed upon said plurality of return addresses; and
   a truncated addition performed upon said plurality of return addresses.

10. Apparatus as claimed in claim 1, comprising a memory system having a hierarchy of memory levels and wherein said one or more prefetch operations prefetch from said memory system at least one of:
    a program instruction;
    a block of program instructions;
    a data value;
    a block of data values; and
    translation data for translating between virtual addresses and physical addresses within said memory.

11. Apparatus as claimed in claim 1, comprising a signature cache memory configured to store for each of a plurality of signature values respective prefetch data indicative of one or more prefetch operations to be performed.

12. Apparatus as claimed in claim 11, comprising at least one further cache memory and wherein said prefetch data for a given signature value identifies one or more addresses associated with respective cache misses within said one or more further cache memories that previously occurred when said apparatus had a state corresponding to said given signature and said one or more prefetch operations comprise cache prefetch operations corresponding to said cache misses.

13. Apparatus as claimed in claim 12, wherein said prefetch data identifies at least one base memory address and for each base memory address a bit field identifying one or more further memory addresses relative to said base memory address.

14. Apparatus as claimed in claim 12, comprising miss detecting circuitry coupled to said one or more further cache memories and configured to detect cache misses within said one or more further cache memories.

15. Apparatus as claimed in claim 14, wherein said miss detecting circuitry accumulates data identifying cache misses for a current signature value and updates said prefetch data for said current signature value when said current signature value changes to a new current signature value.

16. Apparatus as claimed in claim 1, wherein said signature generation circuitry comprises a return address stack memory storing data identifying a sequence of return addresses generated during immediately preceding execution of said stream of program instructions.

17. Apparatus as claimed in claim 16, wherein said return address stack memory is a ring buffer memory.

18. Apparatus as claimed in claim 2, wherein said prefetch circuitry is configured to use said updated signature value to predict an $N^{th}$ following updated signature value that will be generated based upon a sequence of previously generated updated signature values, where N is an integer of one or more, and said one or more prefetch operations performed are prefetch operations associated with said $N^{th}$ following updated signature value.

19. Apparatus as claimed in claim 18, wherein said prefetch circuitry comprises table storage circuitry configured to store data mapping updated signature values to respective $N^{th}$ following updated signature values.

20. Apparatus for processing data in response to execution of a stream of program instructions including call instructions with respective associated return addresses, said apparatus comprising:
    signature generation means for generating a signature value indicative of a current state of said apparatus in dependence upon address values of a plurality of return addresses generated during execution of said stream; and
    prefetch means for performing one or more prefetch operations in dependence upon said signature value.

21. A method of processing data, using apparatus for processing data, in response to execution of a stream of program instructions including call instructions with respective associated return addresses, said method comprising the steps of:
    generating a signature value indicative of a current state of said apparatus in dependence upon address values of a plurality of return addresses generated during execution of said stream; and
    performing one or more prefetch operations in dependence upon said signature value.

\* \* \* \* \*